United States Patent
Enshu

(10) Patent No.: US 8,844,710 B2
(45) Date of Patent: Sep. 30, 2014

(54) CONVEYOR BELT AND PIPE CONVEYOR

(75) Inventor: Hirozumi Enshu, Yokosuka (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/001,704

(22) PCT Filed: Feb. 23, 2012

(86) PCT No.: PCT/JP2012/054395
§ 371 (c)(1),
(2), (4) Date: Aug. 27, 2013

(87) PCT Pub. No.: WO2012/117932
PCT Pub. Date: Sep. 7, 2012

(65) Prior Publication Data
US 2013/0334013 A1    Dec. 19, 2013

(30) Foreign Application Priority Data
Feb. 28, 2011    (JP) ................. 2011-041558

(51) Int. Cl.
*B65G 15/08* (2006.01)
*B65G 15/36* (2006.01)

(52) U.S. Cl.
CPC ............. *B65G 15/08* (2013.01); *B65G 15/36* (2013.01)
USPC .......................................... 198/819; 198/847

(58) Field of Classification Search
USPC .......................................... 198/819, 846, 847
See application file for complete search history.

(56) References Cited

U.S. PATENT DOCUMENTS 5,060,787 A * 10/1991 Tingskog ..................... 198/819
5,328,023 A * 7/1994 Hinkelmann et al. ........ 198/847
(Continued)

FOREIGN PATENT DOCUMENTS

CN    86 2 06749 U    11/1987
CN    101674991 A    3/2010
(Continued)

OTHER PUBLICATIONS

International Search Report for PCT/JP2012/054395 dated May 22, 2012.
(Continued)

*Primary Examiner* — Mark A Deuble
(74) *Attorney, Agent, or Firm* — Sughrue Mion, PLLC

(57) ABSTRACT

Provided is a conveyor belt (2) that includes a body rubber (21) extending in a longitudinal direction of the belt; a plurality of tension bodies (22) that extend in the longitudinal direction of the belt, are disposed in a width direction of the belt, and are embedded in the body rubber (21); and a reinforcement layer (23) that extends in the longitudinal direction of the belt and is embedded in at least one of portions within the body rubber (21), which is located between the tension bodies (22) and each of top surface and bottom surfaces of the body rubber (21), wherein the reinforcement layer (23) is formed in which a plurality of fabric members (24) extending in the longitudinal direction of the belt are continuously provided in the width direction of the belt, the side end sections (24a) of the fabric members (24) among the fabric members (24), which are adjacent to each other in the width direction of the belt are connected to each other to form a fabric joint section (25), and the fabric joint section (25) is disposed on the inner side in the width direction of the belt rather than the both side end sections in the body rubber (21), and is disposed on an intermediate section (21c) that includes the center in the width direction of the belt.

3 Claims, 5 Drawing Sheets

(56) References Cited

U.S. PATENT DOCUMENTS

| | | | | |
|---|---|---|---|---|
| 5,351,810 | A | * | 10/1994 | Tingskog ................. 198/819 |
| 6,029,801 | A | * | 2/2000 | Odin et al. .............. 198/847 |
| 6,540,069 | B2 | * | 4/2003 | Tschantz ................. 198/844.1 |
| 8,240,463 | B2 | * | 8/2012 | Graber et al. ............ 198/847 |

FOREIGN PATENT DOCUMENTS

| | | | |
|---|---|---|---|
| CN | 101932516 | A | 12/2010 |
| JP | 59-173612 | U | 11/1984 |
| JP | 8-258932 | A | 10/1996 |
| JP | 9-315534 | A | 12/1997 |
| JP | 2001-72220 | A | 3/2001 |
| JP | 2002-114342 | A | 4/2002 |

OTHER PUBLICATIONS

Chinese Office Action, dated Jul. 23, 2014, issued in Chinese Patent Application No. 201280010675.3.

* cited by examiner

CONVEYOR BELT AND PIPE CONVEYOR

TECHNICAL FIELD

The present invention relates to a conveyor belt and a pipe conveyor. Priority is claimed on Japanese Patent Application No. 2011-041558, filed Feb. 28, 2011, the content of which is incorporated herein by reference.

BACKGROUND ART

From the related art, for example, a conveyor belt as described in Patent Document 1 described below has been known. The conveyor belt includes a body rubber extending in a longitudinal direction of the belt; a plurality of tension bodies that extend in the longitudinal direction of the belt, are disposed in a width direction of the belt, and are embedded in the body rubber; and a continuous canvas that extends in the longitudinal direction of the belt and is embedded in a portion within the body rubber, which is located between the tension bodies and a bottom surface of the body rubber.

In the above-mentioned conveyor belt, flexural rigidity in the width direction of the belt is improved by including the continuous canvas. Thus, when the conveyor belt is rounded in the width direction of the belt so that both of the side end sections of the body rubber overlap with each other on the upper side in a vertical direction to form a pipe-shaped section extending in the longitudinal direction of the belt, it is possible to suppress the side end section of the body rubber in the pipe-shaped section from being excessively bent, for example, due to its own weight or the like. Accordingly, it is possible to suppress the pipe-shaped section from being deformed flat. For this reason, this type of conveyor belt is generally adopted for a pipe conveyor that accommodates and carries an object to be carried in the pipe-shaped section.

CITATION LIST

Patent Document

[Patent Document 1]
Japanese Unexamined Patent Application, First Publication No. H9-315534

SUMMARY OF INVENTION

Technical Problem

In this connection, in recent pipe conveyors, a demand for a large diameter of the pipe-shaped section of the conveyor belt has increased, and wider conveyor belts have been required so as to cope with this demand.

In the conveyor belt of the related art as described above, in order to design a wider width, there is a need for a wide continuous canvas that is a large size in the width direction of the belt. However, in order to cope with the demand for a wide width of the recent conveyor belts as described above, there is a need for a special continuous canvas having a larger size in the width direction of the belt than generally distributed continuous canvases. In order to form such a continuous canvas, a manufacturing device of special specifications is required. For this reason, there is a problem of rising manufacturing costs.

In addition, instead of including the continuous canvas, improving flexural rigidity of the conveyor belt in the width direction of the belt by a configuration in which the body rubber is formed to be thicker can also be considered. However, in this case, since the weight of the belt increases and maximum tension acting on the conveyor belt increases, for example, there is a need to increase an outer diameter of the tension body or the like. Accordingly, the manufacturing cost rises.

The present invention has been made in view of the above-mentioned circumstances, and an object thereof is to provide a conveyor belt that is capable of being formed at a low cost at a wide width.

Solution to Problem

In order to achieve the aforementioned objects, the present invention suggests the following means.

A conveyor belt related to a first aspect of the present invention includes a body rubber extending in a longitudinal direction of the belt; a plurality of tension bodies that extend in the longitudinal direction of the belt, are disposed in a width direction of the belt, and are embedded in the body rubber; and a reinforcement layer that extends in the longitudinal direction of the belt and is embedded in at least one of portions within the body rubber, which is located between the tension bodies and each of a top surface and bottom surfaces of the body rubber. Furthermore, the conveyor belt is rounded in the width direction of the belt so that the side end sections of the body rubber overlap on the upper side in the vertical direction to form a pipe-shaped section extending in the longitudinal direction of the belt, and an object to be carried is accommodated therein. The reinforcement layer is formed in which a plurality of fabric members extending in the longitudinal direction of the belt are continuously provided in the width direction of the belt. The side end sections of the fabric members among the fabric members, which are adjacent to each other in the width direction of the belt are connected to each other to form a fabric joint section. Furthermore, the fabric joint section is disposed on the inner side in the width direction of the belt rather than the both side end sections in the body rubber, and is disposed in an intermediate section that includes the center in the width direction of the belt.

Furthermore, a pipe conveyor related to a first aspect of the present invention has the conveyor belt, and a belt support device that has a plurality of idlers disposed around a pipe axis on the outer side of the pipe-shaped section in the radial direction, and supports the pipe-shaped section by the contact of the idlers with the pipe-shaped section from the outer side in the radial direction.

According to the aspect of the invention, the reinforcement layer is formed in which the plurality of fabric members are disposed in the width direction of the belt. For this reason, even when one wide continuous fabric is not used, the wide reinforcement layer can be formed by the plurality of fabric members, and thus the conveyor belt can be formed at a low cost at a wide width.

Furthermore, since the fabric joint section is disposed in the intermediate section of the body rubber, when the conveyor belt is rounded in a pipe shape to form the pipe-shaped portion, it is possible to easily maintain the shape of the pipe-shaped section with high accuracy.

That is, for example, the fabric joint section has a configuration in which the side end sections of the fabric members adjacent to each other in the width direction of the belt overlap or a configuration in which side end sections abut.

Among these, when the fabric joint section has a configuration in which the side end sections of the fabric member overlap, and flexural rigidity of the fabric joint section in the width direction of the belt is higher than flexural rigidity of other sections of the reinforcement layer in the width direction of the belt.

Furthermore, when the fabric joint section has a configuration in which the side end sections of the fabric member abut, flexural rigidity of the fabric joint section in the width direction of the belt is lower than flexural rigidity of other sections in the width direction of the belt.

As described above, flexural rigidity of the fabric joint section in the width direction of the belt is different from flexural rigidity of other sections of the reinforcement layer in the width direction of the belt. For this reason, in the conveyor belt, in the intermediate section of the conveyor belt formed by the intermediate section of the body rubber with the fabric joint section disposed thereon, a different-rigidity section, in which flexural rigidity in the width direction of the belt is different from flexural rigidity of other sections of the conveyor belt in the width direction of the belt, is formed.

Moreover, if the different-rigidity section is formed in the intermediate section of the conveyor belt, when the conveyor belt is rounded in a pipe shape, distortion is liable to occur in the intermediate section of the conveyor belt.

In the conveyor belt, since the pipe-shaped section is formed by mutually overlapping the side end sections of the body rubber on the upper side in the vertical direction, in the pipe-shaped section, the intermediate section of the conveyor belt is located on the lower side in the vertical direction. Accordingly, it is possible to cause load due to its own weight of the conveyor belt and weight of an object to be carried to act on the intermediate section of the conveyor belt. Thus, by bringing the support roller into contact with the intermediate section of the conveyor belt from the outer side of the pipe-shaped section in the radial direction, distortion occurring in the intermediate section of the conveyor belt can be corrected, and the shape of the pipe-shaped section can be easily maintained with high accuracy.

In contrast, for example, when the fabric joint section is disposed on the side end section of the body rubber, it is difficult to maintain the shape of the pipe-shaped section.

That is, in the conveyor belt, the side end section of the conveyor belt formed by the side end section of the body rubber is located on the upper side in the vertical direction when the conveyor belt is formed as the pipe-shaped section. Accordingly, the fabric joint section is disposed on the side end section of the body rubber, and the different-rigidity section is formed on the side end section of the conveyor belt. Thus, for example, when distortion occurs in the side end section of the conveyor belt or the like, it is difficult to correct the distortion, and the shape of the pipe-shaped section may be distorted.

Furthermore, in the conveyor belt, since the plurality of tension bodies are disposed in the width direction of the belt, the above-mentioned working effect can be enhanced.

That is, when the plurality of tension bodies are disposed in the width direction of the belt, the reinforcing effect of reinforcing the flexural rigidity of the conveyor belt in the width direction of the belt by the tension body is liable to be different for each position in the width direction of the belt of the conveyor belt. Accordingly, for example, when the fabric joint section has a configuration in which the side end sections of the fabric member overlap and flexural rigidity in the width direction of the belt is increased, and the fabric joint section is disposed on a section of the conveyor belt in which the reinforcing effect due to the tension body is high, flexural rigidity in the width direction of the belt in the different-rigidity section of the conveyor belt is greatly different from flexural rigidity in the width direction of the belt in other sections of the conveyor belt.

In this case, when the conveyor belt is rounded in a pipe shape to form the pipe-shaped section, distortion is more liable to occur in the intermediate section of the conveyor belt. However, in the above-mentioned conveyor belt, as described above, the distortion occurred in the intermediate section of the conveyor belt can be corrected. As a result, the shape of the pipe-shaped section can be easily maintained with high accuracy.

Furthermore, in the pipe conveyor related to the first aspect of the present invention, the intermediate section of the body rubber may be a section of the body rubber that is located between the intermediate section boundaries separated from the center in the width direction of the belt to the outer sides in the width direction of the belt, by the same distance as the size in the width direction of the belt of the side end section of the body rubber.

In this case, the intermediate section of the body rubber is a section of the body rubber that is located between the intermediate section boundaries separated from the center in the width direction of the belt to the outer sides in the width direction of the belt, by the same distance as the size in the width direction of the belt of the side end section of the body rubber. For this reason, by forming the pipe-shaped section by mutually overlapping the side end sections of the body rubber with each other on the upper side in the vertical direction, the intermediate section of the conveyor belt can be reliably located on the lower side in the vertical direction. As a result, the above-mentioned working effect can be reliably achieved.

In addition, the size of the side end section of the body rubber in the width direction of the belt is equal to the distance in the width direction of the belt from the center in the width direction of the belt in the body rubber to the intermediate section boundaries, and the size in the width direction of the belt of the side end section of the body rubber is $1/7$ of a body width W of the body rubber in the width direction of the belt. In this case, in the pipe-shaped section of the conveyor belt formed with each other by mutually overlapping the side end sections of the body rubber, a central angle around the pipe axis from the center of the body rubber in the width direction of the belt to each intermediate section boundary is 60°.

As described above, there is a case in which, in the pipe-shaped section of the conveyor belt, the central angle around the pipe axis from the center of the body rubber in the width direction of the belt to each intermediate section boundary is 60°. In this case, when the conveyor belt is rounded in a pipe shape to form the pipe-shaped section, and the side end sections of the body rubber overlap with each other on the upper side in the vertical direction, a basic posture in which the center of the body rubber in the width direction of the belt is disposed right below the pipe axis is set. Accordingly, for example, even when the pipe-shaped section of the conveyor belt travels while bent, and thus the pipe-shaped section is twisted in the central angle having the range within 30° around the pipe axis from the basic posture, the intermediate section of the conveyor belt can be continuously located on the lower side in the vertical direction. As a result, the above-mentioned working effect can be achieved.

Advantageous Effects of Invention

According to the conveyor belt related to the first aspect of the present invention, the conveyor belt can be formed at a low cost at a wide width.

Furthermore, according to the pipe conveyor related to the first aspect of the present invention, the diameter of the pipe-shaped section can be increased at a low cost.

DESCRIPTION OF EMBODIMENTS

Hereinafter, a pipe conveyor related to an embodiment of the present invention will be described with reference to the drawings.

Figure 1:
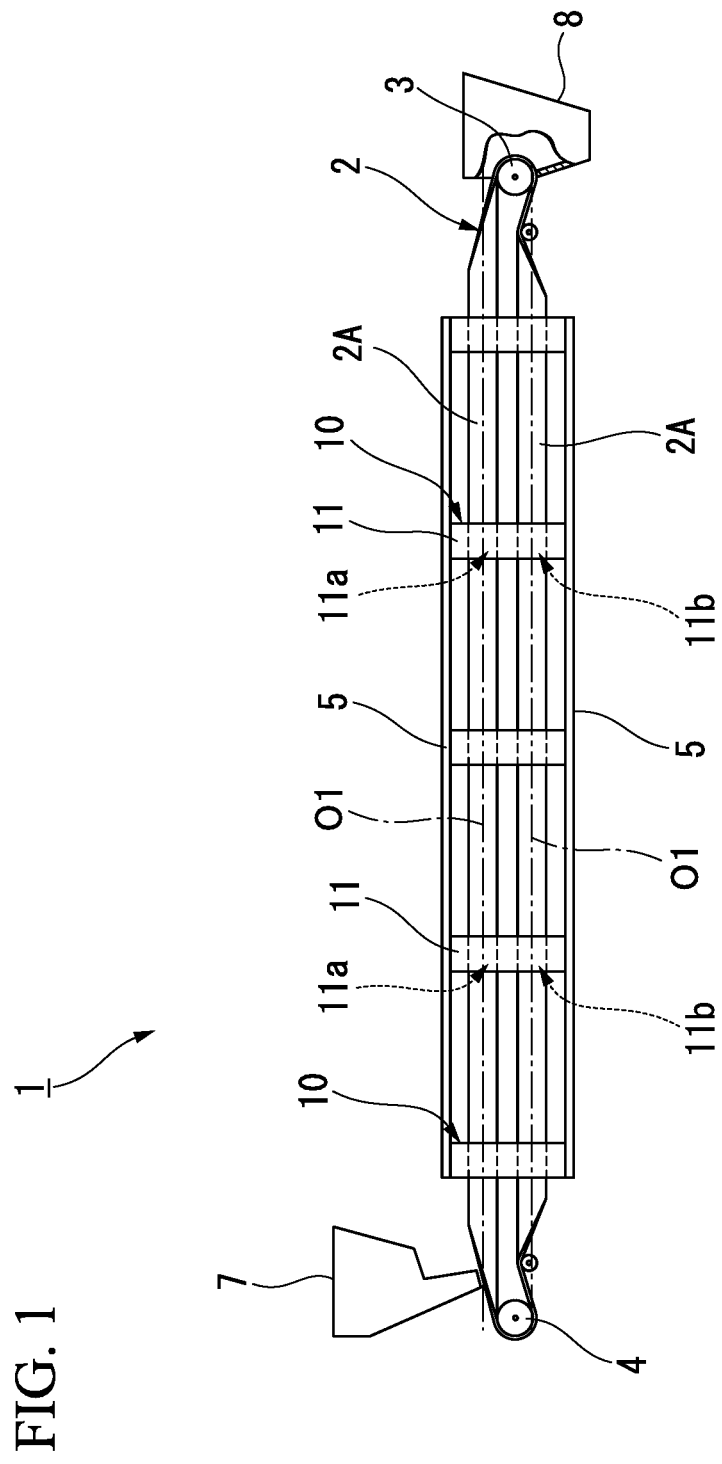
FIG. 1 is a general view of a pipe conveyor related to a first embodiment of the present invention.

As shown in FIG. 1, the pipe conveyor 1 includes a driving drum 3 and a driven drum 4 that rotate around drum axes parallel to each other, an endless belt-shaped conveyor belt 2 that is wound between the driving drum 3 and the driven drum 4 and has a part of which is rounded in a pipe shape, and a belt support device 10 that supports a pipe-shaped section 2A rounded in a pipe shape in the conveyor belt 2.

The drum axes of the driving drum 3 and the driven drum 4 extend in a width direction H of the belt of the conveyor belt 2, and are mutually deviated in the horizontal direction.

The conveyor belt 2 is rounded on both a carrier side on which the conveyor belt 2 travels from the driven drum 4 toward the driving drum 3 and the surface faces vertically upward, and a return side on which the conveyor belt 2 travels from the driving drum 3 toward the driven drum 4 and the surface faces vertically downward. Respective pipe axes O1 of the pipe-shaped section 2A in the conveyor belt 2 of the carrier side and the pipe-shaped section 2A in the conveyor belt 2 of the return side are parallel to each other. Furthermore, the conveyor belt 2 is evenly unfolded in front of each of the driving drum 3 and the driven drum 4 and is wound around each of the drums 3 and 4.

A plurality of belt support devices 10 are disposed between the driving drum 3 and the driven drum 4 at intervals in the direction of the pipe axis O1 of the pipe-shaped section 2A. In the present embodiment, all the pipe support devices 10 are connected to each other via the connection member 5 extending in the direction of the pipe axis O1. The belt support device 10 includes a support frame 11 which has an upper chamber 11a and a lower chamber 11b divided therein. The pipe-shaped section 2A in the conveyor belt 2 of the carrier side passes through the upper chamber 11a of each support frame 11. The pipe-shaped section 2A in the conveyor belt 2 of the return side passes through the lower chamber 11b.

Figure 2:
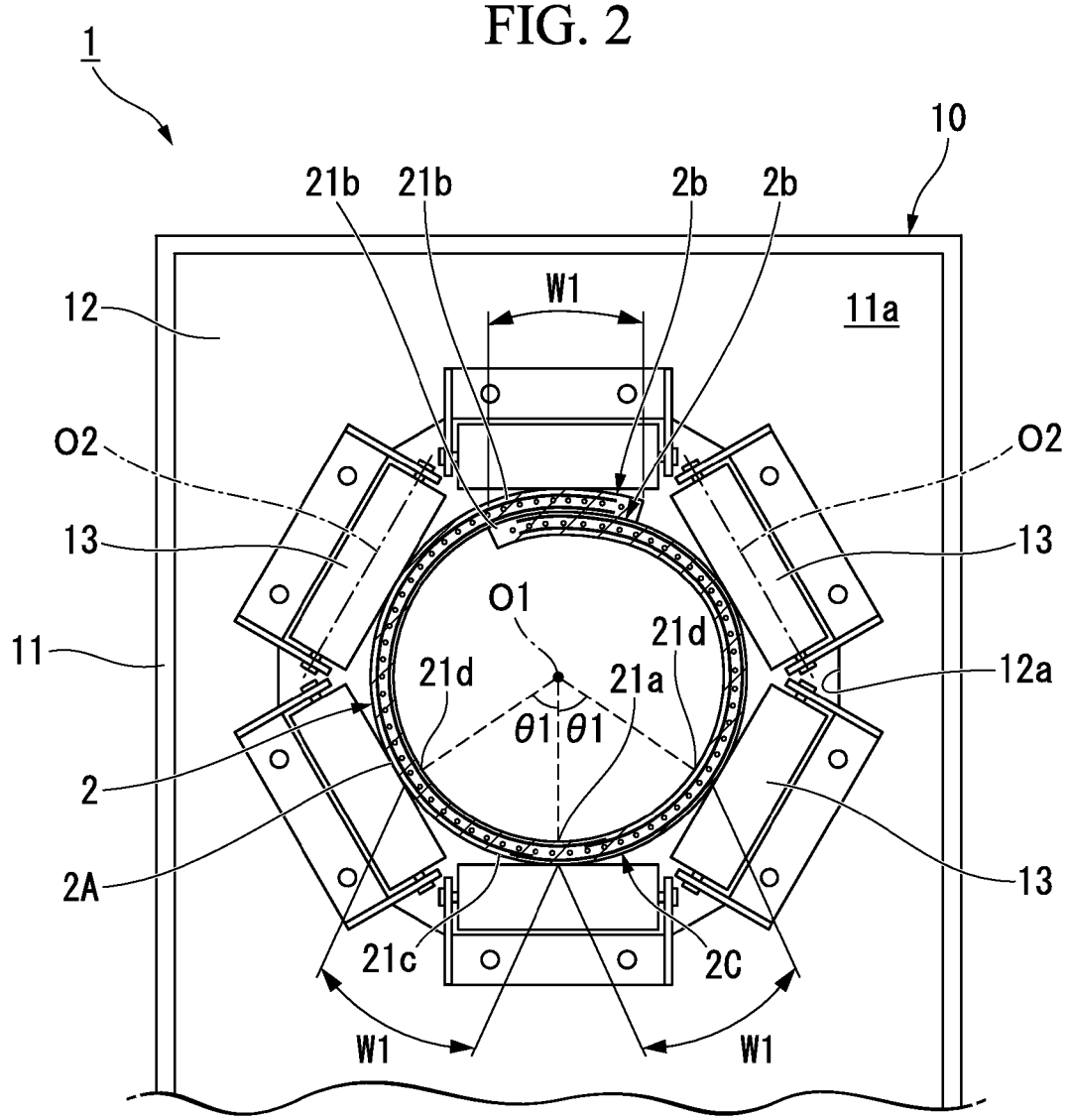
FIG. 2 is a front view of major sections of a belt support device and a conveyor belt included in the pipe conveyor shown in FIG. 1.

As shown in FIG. 2, in each of the upper chamber 11a and the lower chamber 11b, on the outer side in the radial direction of the pipe-shaped section 2A of the conveyor belt 2, a plurality of idlers 13 disposed around the pipe axis O1, and a support plate 12 in which a passing hole 12a for allowing the pipe-shaped section 2A to pass therethrough penetrates in the direction of the pipe axis O1 and supports the idlers 13, are provided.

Furthermore, in the present embodiment, since the lower chamber 11b of the belt support device 10 has the same configuration as the upper chamber 11a, the lower chamber 11b is not shown.

The passing hole 12a is disposed coaxially with the pipe-shaped section 2A of the conveyor belt 2.

Each of the front and back surfaces of the support plate 12 intersects in the direction of the pipe axis O1, and the outer circumferential edge of the support plate 12 is fixed to the support frame 11.

In the front view in which the belt support device 10 is viewed from the direction of the pipe axis O1, the idlers 13 are disposed inside the passing hole 12a along the same circumference. A rotation axis O2 of the idlers 13 extends around the pipe axis O1.

Moreover, the belt support device 10 has a configuration in which the idlers 13 come into contact with the pipe-shaped section 2A from the outer side in the radial direction to support the pipe-shaped section 2A.

Figure 3:
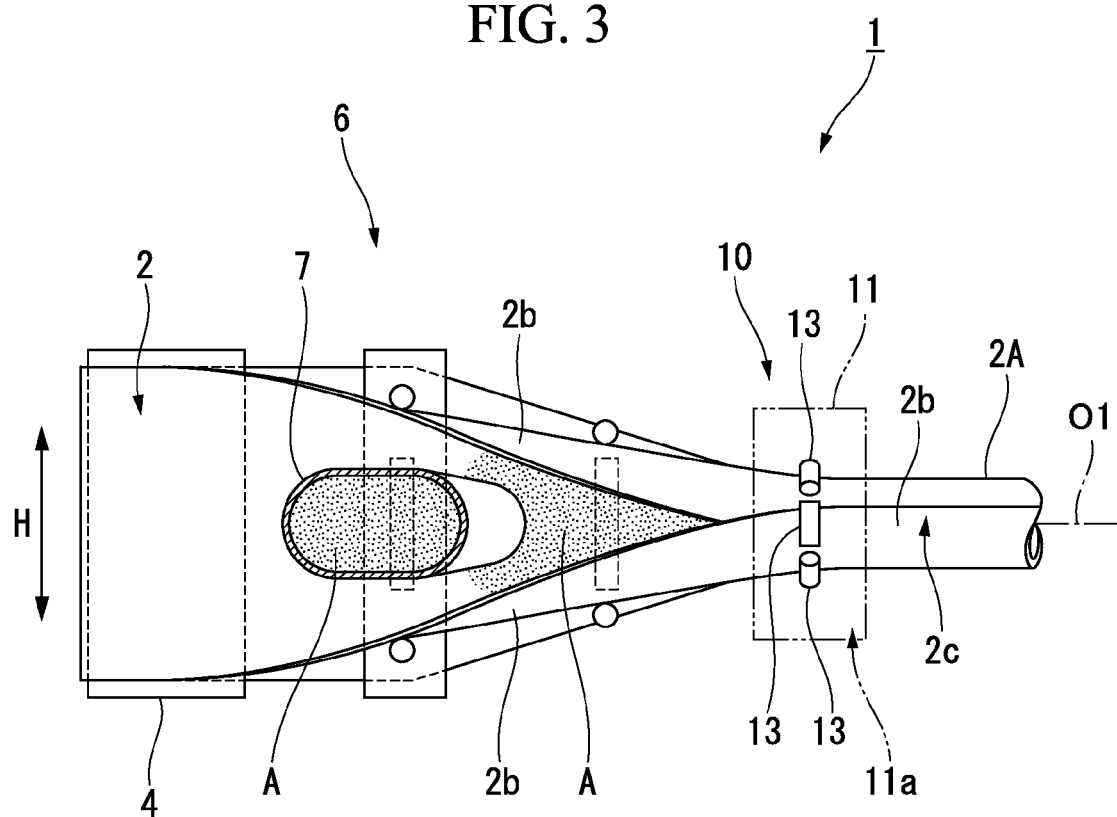
FIG. 3 is a top view of a driven drum side of the pipe conveyor shown in FIG. 1.

As shown in FIG. 3, between the belt support device 10 among the plurality of belt support devices 10, which is located at the nearest position to the driving drum 3 side, and the driven drum 4, a belt rounding device 6 that rounds the unfolded evenly conveyor belt 2 is disposed. The belt rounding device 6 gradually bends both side end sections 2b of the conveyor belt 2 toward the inner side in the width direction H of the belt as the conveyor belt 2 goes from the driven drum 4 toward the belt support device 10 side to gradually round the conveyor belt 2. Furthermore, the belt rounding device 6 guides the conveyor belt 2 to the upper chamber 11a of the belt support device 10.

Furthermore, a hopper 7 for dropping an object to be carried A such as particulate matter onto the surface of the conveyor belt 2 is provided above the driven drum 4. In the present embodiment, the hopper 7 drops the object to be carried A onto the surface of the conveyor belt 2 of the carrier side rounded by the belt rounding device 6 before the conveyor belt 2 is completely rounded. The conveyor belt 2 is rounded by the belt rounding device 6, and thus the object to be carried A is wrapped in the conveyor belt 2.

Furthermore, as shown in FIG. 1, between the belt support device 10 among the plurality of belt support devices 10, which is located at the nearest position to the driving drum 3 side, and the driving drum 3, a belt unfolding device (not shown) that evenly unfolds the rounded conveyor belt 2 is disposed. The belt unfolding device gradually and evenly unfolds the conveyor belt 2 of the carrier side passing through the upper chamber 11a of the belt support device 10 located at the nearest position to the driving drum 3 side as the conveyor belt 2 goes from the belt support device 10 side toward the driving drum 3.

Furthermore, a load-receiving box 8, into which the object to be carried A carried by the conveyor belt 2 of the carrier side is input, is provided on the driving drum 3 side.

Circulation travelling of the conveyor belt 2 in the pipe conveyor 1 will be described.

First, as shown in FIG. 3, the conveyor belt 2 passing through the driven drum 4 unfolded evenly from the lower side to the upper side is gradually rounded as the conveyor belt 2 goes toward the belt support device 10 side by the belt rounding device 6. At this time, before the conveyor belt 2 is completely rounded, the object to be carried A is dropped onto the surface of the conveyor belt 2 from the hopper 7.

Next, the conveyor belt 2 enters the upper chamber 11a of the belt support device 10 among the plurality of belt support devices 10, which is located at the nearest position to the driven drum 4, and the conveyor belt 2 is rounded in a pipe shape. Accordingly, the object to be carried A is wrapped in the conveyor belt 2, and then, as shown in FIG. 2, the pipe-shaped conveyor belt 2 with the object to be carried A wrapped therein passes through the upper chamber 11a of each belt support device 10, while maintaining the pipe shape.

Moreover, as shown in FIG. 1, the conveyor belt 2 passing through the upper chamber 11a of the belt support device 10 among the belt support devices 10, which is located at the nearest position to the driving drum 3 side, is gradually unfolded as the conveyor belt 2 goes toward the driving drum 3 side by the belt unfolding device, and then inputs the object to be carried A into the load-receiving box 8.

In addition, the conveyor belt 2 of the return side passing though the driving drum 3 from the upper side to the lower side is rounded in a pipe shape, passes through the lower chamber 11b of each belt support device 10, is unfolded evenly, is returned to the driven drum 4, and performs the circulation travelling. Even in the conveyor belt 2 of the return side, by adopting the same configurations as the belt rounding device 6 and the belt unfolding device, the conveyor belt 2 can be rounded and then can be unfolded evenly.

Figure 4:
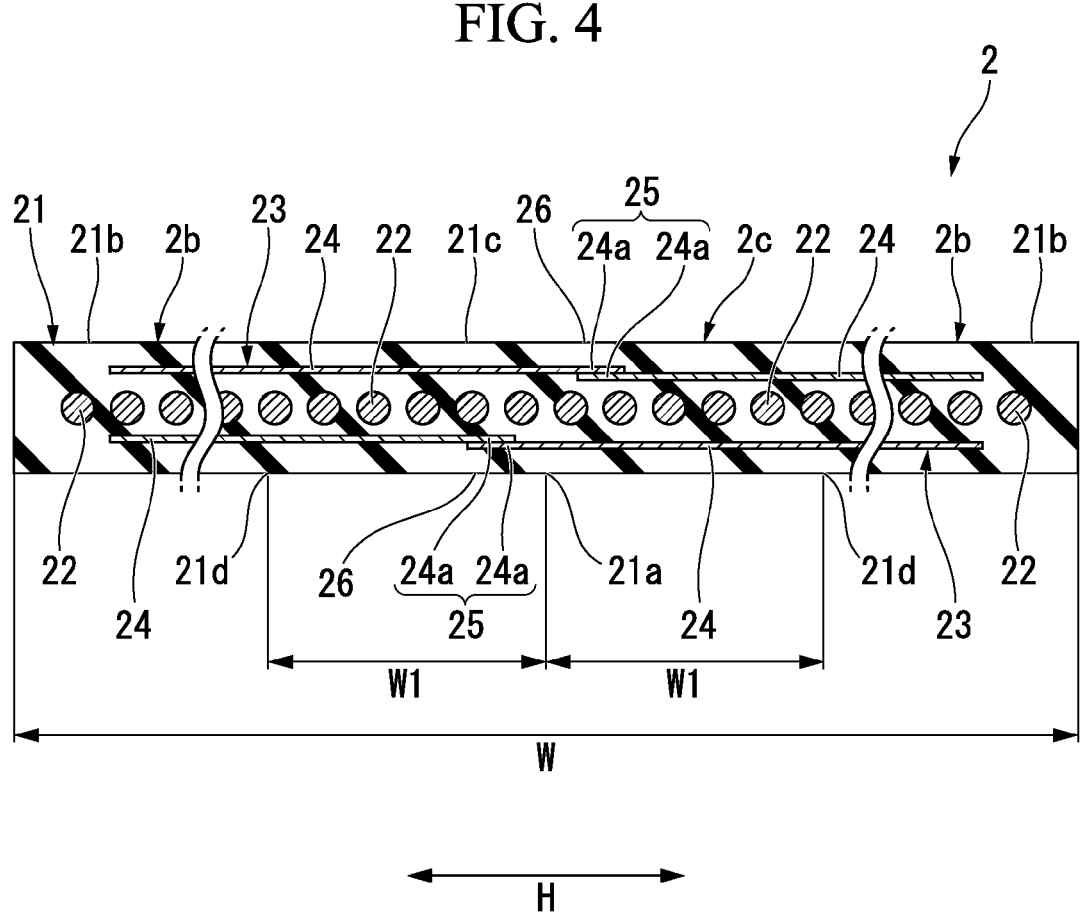
FIG. 4 is a cross-sectional view of the conveyor belt included in the pipe conveyor shown in FIG. 1.

Next, the conveyor belt 2 as shown in FIG. 4 will be described.

The conveyor belt 2 includes a body rubber 21 that extends in the longitudinal direction of the belt, a plurality of tension bodies 22 that extend in the longitudinal direction of the belt, are disposed in the width direction H of the belt, and are embedded in the body rubber 21, and reinforcement layers 23 that extend in the longitudinal direction of the belt and are embedded in the body rubber 21.

The body width W of the body rubber 21 in the width direction H of the belt is, for example, equal to or greater than about 2250 mm. Accordingly, the pipe diameter of the pipe-shaped section 2A of the conveyor belt 2 is, for example, equal to or greater than about 600 mm.

The tension bodies 22 are, for example, formed of steel cords or the like. The plurality of tension bodies 22 are disposed in the central portion of the body rubber 21 in the thickness direction over approximately the whole area in the width direction H of the belt at intervals in the width direction H of the belt.

The reinforcement layers 23 improve flexural rigidity of the conveyor belt 2 in the width direction H of the belt. The reinforcement layers 23 are located in the body rubber 21 and disposed in sections located between the center section in the thickness direction in which the tension body 22 is embedded and each of the top and bottom surfaces of the body rubber 21. Furthermore, the reinforcement layers 23 are each disposed one by one over approximately the entire area in the width direction H of the belt. The sizes in the width direction H of the belt and the positions in the width direction H of the belt of the reinforcement layers 23 are the same. Furthermore, the side end edges of the reinforcement layers 23 in the width direction H of the belt are located further inward in the body rubber 21 in the width direction H of the belt rather than one of the tension bodies 22, which is located at the outermost positions in the width direction H of the belt.

Moreover, in the present embodiment, the reinforcement layers 23 are configured so that a plurality of fabric members 24 extending in the longitudinal direction of the belt are continuously provided in the width direction H of the belt.

As the fabric members 24, for example, it is possible to adopt cord fabric sheets or the like that are formed by mutually weaving warp yarns and weft yarns formed of synthetic fibers. Examples of the synthetic fibers may include nylon, polyamide, polyester, aramid and the like. In addition, the fabric member 24 may be coated by covering rubber (not shown) having adhesive properties.

The reinforcement layer 23 is formed by two (plural) fabric members 24 disposed in the width direction H of the belt, and the fabric widths of the two fabric members 24 in the width direction H of the belt are equal. Furthermore, the side end sections 24a of the two fabric members 24 adjacent to each other in the width direction H of the belt are connected to each other to form the fabric joint section 25. In the present embodiment, the fabric joint section 25 has a configuration in which the side end sections 24a of the fabric members 24 overlap. Furthermore, the joint width of the fabric joint section 25 in the width direction H of the belt is, for example, smaller than 1/7 of the body width W.

Furthermore, the fabric joint section 25 is disposed on the intermediate section 21c including the center 21a of the body rubber 21 in the width direction H of the belt. The intermediate section 21c is located further inward in the width direction H of the belt rather than the side end sections 21b that form the side end sections 2b of the conveyor belt 2, respectively. In addition, in the present embodiment, the intermediate section 21c of the body rubber 21 on which the fabric joint section 25 is disposed is a section of the body rubber 21 that is located between the intermediate section boundaries 21d separated from the center 21a in the width direction H of the belt to the outer sides in the width direction H of the belt, by 1/7 of the body width W (by the size W1=W·(1/7) shown in FIG. 4), respectively.

The respective fabric joint sections 25 on the two reinforcement layers 23 are mutually deviated in the width direction H of the belt. In the present embodiment, the respective fabric joint sections 25 are offset to the opposite sides in the width direction H of the belt from the center 21a of the body rubber 21 in the width direction H of the belt. Each distance from the respective distances from the center 21a of the body rubber 21 in the width direction H of the belt to the fabric joint sections 25 in the width direction H of the belt are equal.

Moreover, as shown in FIG. 2, in the conveyor belt 2, the pipe-shaped section 2A of the carrier side is rounded in the width direction H of the belt so that the side end sections 21b of the body rubber 21 overlap on the upper side in the vertical direction, and extends in the longitudinal direction of the belt, and the object to be carried is accommodated therein.

In addition, in the present embodiment, the size W1 in the width direction H of the belt of the side end sections 21b of the body rubber 21 overlapping on the upper side in the vertical direction is 1/7 of the body width W, and is equal to the distance W1 in the width direction H of the belt from the center 21a in the width direction H of the belt to the intermediate section boundaries 21d in the body rubber 21.

As in the present embodiment, the size W1 of the side end section 21b of the body rubber 21 in the width direction H of the belt is equal to the distance W1 from the center 21a of the body rubber 21 in the width direction H of the belt to the intermediate section boundaries 21d, and the size W1 of the side end section 21b of the body rubber 21 in the width direction H of the belt is set to 1/7 of the body width W. In this case, in the pipe-shaped section 2A of the conveyor belt 2 that is formed by mutually overlapping the side end sections 21b of the body rubber 21, a central angle θ1 around the pipe axis O1 from the center 21a of the body rubber 21 in the width direction H of the belt to the intermediate section boundaries 21d is 60°.

Next, the operation of the conveyor belt 2 will be described.

Figure 5:
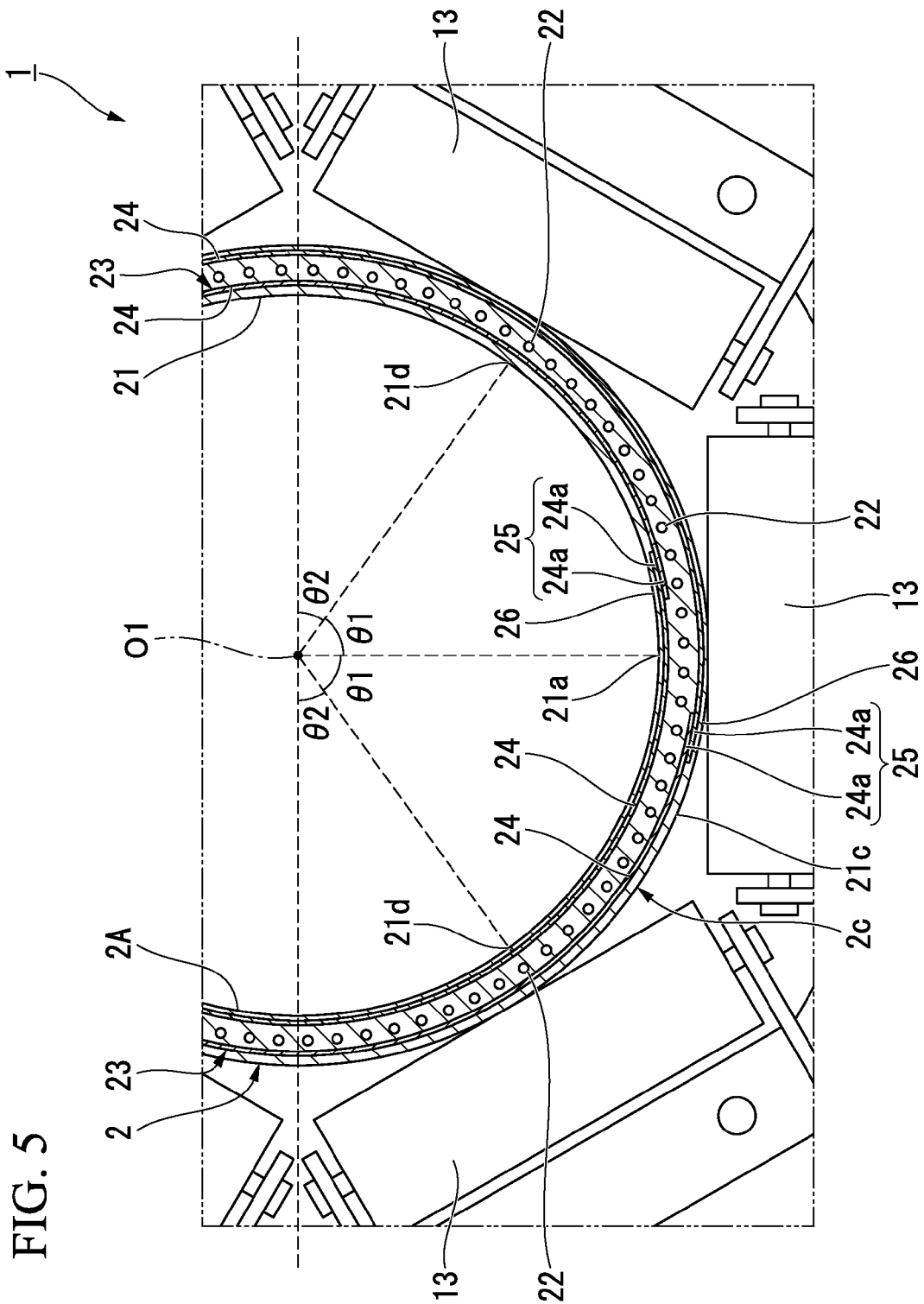
FIG. 5 is a partially enlarged view of portions of major sections of the belt support device and the conveyor belt shown in FIG. 2.

As shown in FIG. 5, in the conveyor belt 2, the fabric joint section 25 has a configuration in which the side end sections 24a of the fabric members 24 overlap. For this reason, flexural rigidity of the fabric joint section 25 in the width direction H of the belt is higher than flexural rigidity of other sections of the reinforcement section 23 in the width direction H of the belt.

Flexural rigidity of the fabric joint section 25 in the width direction H of the belt is different from flexural rigidity of other sections of the reinforcement layer 23 in the width direction H of the belt. For this reason, in the conveyor belt 2, in the intermediate section 2c of the conveyor belt 2 formed by the intermediate section 21c of the body rubber 21 on which the fabric joint section 25 is disposed, a different-rigidity section 26 is formed in which flexural rigidity in the width direction H of the belt is different from flexural rigidity of other sections of the conveyor belt 2 in the width direction H of the belt. In addition, in the present embodiment, flexural rigidity of the different-rigidity section 26 in the width direction H of the belt is higher than flexural rigidity of other sections in the width direction H of the belt.

Moreover, if the different-rigidity section 26 is formed on the intermediate section 2c of the conveyor belt 2, when the conveyor belt 2 is rounded in a pipe shape, distortion is liable to occur in the intermediate section 2c of the conveyor belt 2.

As shown in FIG. 2, in the conveyor belt 2, the pipe-shaped section 2A is formed by overlapping the side end sections 21b of the body rubber 21 on the upper side in the vertical direction. Thus, in the pipe-shaped section 2A, the intermediate section 2c of the conveyor belt 2 is located on the lower side in the vertical direction. Accordingly, for example, it is possible to cause load due to its own weight of the conveyor belt 2 and weight of the object to be carried A to act on the intermediate section 2c of the conveyor belt 2. For this reason, by bringing the support roller 13 into contact with the intermediate section 2c of the conveyor belt 2 from the outer side of the pipe-shaped section 2A in the radial direction, the distortion occurring in the intermediate section 2c of the conveyor belt 2 can be corrected. As a result, it is possible to easily maintain the shape of the pipe-shaped section 2A with high accuracy.

In contrast, for example, when the fabric joint section 25 is disposed on the side end section 21b of the body rubber 21, it is difficult to maintain the shape of the pipe-shaped section 2A.

That is, in the conveyor belt 2, the side end section 2b of the conveyor belt 2 formed by the side end section 21b of the body rubber 21 is located on the upper side in the vertical direction when a part of the conveyor belt 2 is formed as the pipe-shaped section 2A. Accordingly, the fabric joint section 25 is disposed on the side end section 21b of the body rubber 21, and the different-rigidity section 26 is formed on the side end section 2b of the conveyor belt 2. Accordingly, for example, when distortion occurs in the side end section 2b of the conveyor belt 2, it is difficult to correct the distortion, and the shape of the pipe-shaped section 2A may be distorted.

As described above, according to the conveyor belt 2 related to the present embodiment, the reinforcement layers 23 are formed in which the plurality of fabric members 24 are disposed in the width direction H of the belt. For this reason, even when one wide continuous fabric is not used, the wide reinforcement layer 23 can be formed by the plurality of fabric members 24. As a result, the conveyor belt 2 can be formed at a low cost and a wide width.

Furthermore, the fabric joint section 25 is disposed on the intermediate section 21c of the body rubber 21. For this reason, when a part of the conveyor belt 2 is rounded in a pipe shape to form the pipe-shaped section 2A, it is possible to easily maintain the shape of the pipe-shaped section 2A with high accuracy.

Furthermore, in the present embodiment, the respective fabric joint sections 25 of the two reinforcement layers 23 are mutually deviated in the width direction H of the belt. For this reason, compared to a case in which the positions of the fabric joint sections 25 in the width direction H of the belt are equal, it is possible to suppress flexural rigidity of the different-rigidity section 26 of the conveyor belt 2 in the width direction H of the belt from being greatly different from flexural rigidity of other sections of the conveyor belt 2 in the width direction H of the belt. Thus, it is possible to suppress the distortion from occurring in the intermediate section 2c of the conveyor belt 2.

Furthermore, in the conveyor belt 2, since the plurality of tension bodies 22 are disposed in the width direction H of the belt, the above-mentioned working effect can be enhanced.

That is, when the plurality of tension bodies 22 are disposed in the width direction H of the belt, the reinforcing effect of reinforcing flexural rigidity of the conveyor belt 2 in the width direction H of the belt by the tension body 22 is liable to be different for each position of the conveyor belt 2 in the width direction H of the belt. In the present embodiment, the plurality of tension bodies 22 are disposed at intervals in the width direction H of the belt. For this reason, in the section of the conveyor belt 2 on which the tension bodies 22 are disposed, the reinforcing effect using the tension bodies 22 is achieved. However, in the sections located between the tension bodies 22 adjacent to each other in the width direction H of the belt, the reinforcing effect using the tension bodies 22 is not achieved.

Accordingly, as in the present embodiment, the fabric joint section 25 has a configuration in which the side end sections 24a of the fabric member 24 overlap, and flexural rigidity in the width direction H of the belt is enhanced. In this case, when the fabric joint section 25 is disposed in the section of the conveyor belt 2 in which the reinforcing effect using the tension bodies 22 is high, flexural rigidity in the different-rigidity section 26 of the conveyor belt 2 in the width direction H of the belt is greatly different from flexural rigidity in other sections of the conveyor belt 2 in the width direction H of the belt.

In the above-mentioned case, when a part of the conveyor belt 2 is rounded in a pipe shape to form the pipe-shaped section 2A, distortion is more liable to occur in the intermediate section 2c of the conveyor belt 2. However, in the conveyor belt 2, as described above, since it is possible to correct the distortion occurring in the intermediate section 2c of the conveyor belt 2, it is possible to easily maintain the shape of the pipe-shaped section 2A with high accuracy.

Furthermore, according to the pipe conveyor 1 related to the present embodiment, since the conveyor belt 2 is included, the diameter of the pipe-shaped section 2A can be increased at a low cost.

Furthermore, the intermediate section 21c of the body rubber 21 is a section of the body rubber 21 that is located between the intermediate section boundaries 21d separated from the center 21a in the width direction H of the belt to the outer sides in the width direction H of the belt, respectively, by the distance equal to the size in the width direction H of the belt of the side end section 21b of the body rubber 21. For this reason, by forming the pipe-shaped section 2A by mutually overlapping the side end sections 21b of the body rubber 21 on the outer side in the vertical direction, the intermediate section 2c of the conveyor belt 2 can be reliably located on the lower side in the vertical direction. As a result, the above-mentioned working effect can be reliably achieved.

Furthermore, as shown in FIG. 2, in the pipe-shaped section 2A of the conveyor belt 2, the central angle θ1 around the pipe axis O1 from the center 21a of the body rubber 21 in the width direction H of the belt to each intermediate section boundary 21d is 60°. In this case, when a part of the conveyor belt 2 is rounded in a pipe shape to form the pipe-shaped section 2A, and the side end sections 21b of the body rubber 21 overlap on the upper side in the vertical direction, as shown in FIG. 5, a basic posture is set in which the center 21a of the body rubber 21 in the width direction H of the belt is disposed right below the pipe axis O1. Thus, for example, even when the pipe-shaped section 2A of the conveyor belt 2 travels while bent and thus the pipe-shaped section 2A is twisted in the central angle having the range within 30° (the range of the central angle θ2 shown in FIG. 5) around the pipe axis O1 from the basic posture, the intermediate section 2c of the conveyor belt 2 can be continuously located on the lower side in the vertical direction. As a result, the above-mentioned working effect can be achieved.

In addition, the technical scope of the present invention is not limited to the above-mentioned embodiment, and various modifications can be added within the scope that does not depart from the gist of the present invention.

For example, in the above-mentioned embodiment, although the respective fabric joint sections 25 in two reinforcement layers 23 are assumed to be mutually deviated in the width direction H of the belt, the positions of the fabric joint sections 25 in the width direction H of the belt may be the same, without being limited thereto. In this case, the positions of the fabric joint sections 25 in the width direction H of the belt are preferably the center 21a of the body rubber 21 in the width direction H of the belt.

Furthermore, in the above-mentioned embodiment, although the fabric joint section 25 is assumed to have a configuration in which the side end sections 24a of the fabric member 24 overlap, for example, the fabric joint section 25 may have a configuration in which the side end sections 24a of the fabric member 24 abut, without being limited thereto.

In this case, flexural rigidity of the fabric joint section 25 in the width direction H of the belt is lower than flexural rigidity of other sections in the width direction H of the belt, and flexural rigidity of the different-rigidity section 26 of the conveyor belt 2 in the width direction H of the belt is lower than flexural rigidity of other sections of the conveyor belt 2 in the width direction H of the belt.

Furthermore, in the above-mentioned embodiment, although the size of the side end section 21b of the body rubber 21 in the width direction H of the belt is assumed to be 1/7 of the body width W, as the side end section 21b of the body rubber 21, a section greater than 1/7 of the body width W and a section greater than 1/7 of the body width W may overlap, without being limited thereto.

Furthermore, in the above-mentioned embodiment, although the intermediate section 21c of the body rubber 21 is assumed to be a section of the body rubber 21 that is located between the intermediate section boundaries 21d separated from the center 21a in the width direction H of the belt to both outer sides in the width direction H of the belt, respectively, by the distance that is equal to the size in the width direction H of the belt of the side end section 21b of the body rubber 21, the configuration is not limited thereto. That is, the intermediate section 21c of the body rubber 21 may be located inside the body rubber 21 in the width direction H of the belt rather than the side end sections 21b and may include the center 21a in the width direction H of the belt, and the fabric joint section 25 may be disposed on the intermediate section 21c of the body rubber 21.

Furthermore, in the above-mentioned embodiment, although the fabric widths of the fabric members 24 are assumed to be equal, the configuration is not limited thereto.

Furthermore, in the above-mentioned embodiment, although the reinforcement layer 23 is assumed to be formed by the two fabric members 24, the reinforcement layer 23 may be formed by three or more fabric members 24. In this case, although the plurality of fabric joint sections 25 are formed in the width direction H of the belt, it is possible to adopt a configuration in which all the fabric joint sections 25 are disposed on the intermediate section 21c of the body rubber 21.

Furthermore, in the above-mentioned embodiment, although the reinforcement layer 23 is configured so that, in the body rubber 21, both of the sizes in the width direction H of the belt and the positions in the width direction H of the belt of the reinforcement layers 23 disposed on each section located between the central portion in the thickness direction and each of the top and bottom surfaces of the body rubber 21 are assumed to be equal, the sizes and each of the both may be different from each other.

Furthermore, in the present embodiment, although the reinforcement layers 23 are assumed to be disposed on sections of the body rubber 21 located between the central portion in the thickness direction and each of the top and bottom surfaces of the body rubber 21 one by one, the reinforcement layer 23 may be embedded in at least one of these sections.

Furthermore, although the conveyor belt 2 is assumed to be rounded on the return side, the conveyor belt 2 may not be rounded on the return side. That is, if the conveyor belt 2 has a configuration in which the conveyor belt 2 is rounded in the width direction H of the belt so that the side end sections 21b of the body rubber 21 overlap on the upper side in the vertical direction to form the pipe-shaped section 2A extending in the longitudinal direction of the belt, and the object to be carried A is accommodated therein, the conveyor belt 2 can be suitably changed.

INDUSTRIAL APPLICABILITY

The conveyor belt according to the present invention can be formed at a low cost and a wide width, and the diameter of the pipe-shaped section can be increased at a low cost.

In addition, it is possible to suitably replace the components in the above-mentioned embodiment with well-known components within the scope that does not depart from the gist of the present invention, and the above-mentioned modified examples may be suitably combined.

REFERENCE SIGNS LIST

1 Pipe conveyor
2 Conveyor belt
2A Pipe-shaped section
10 Support device
13 Support roller
21 Body rubber
21a Center of body rubber in width direction of belt
21b Side end section of body rubber
21c Intermediate section of body rubber
21d Intermediate section boundary
22 Tension body
23 Reinforcement layer
24 Fabric member
24a Side end section of fabric member
25 Fabric joint section
A Object to be carried H Width direction of belt
O1 Pipe axis
W Body width

The invention claimed is:

1. A conveyor belt comprising:
a body rubber extending in a longitudinal direction of the conveyor belt;
a plurality of tension bodies that extend in the longitudinal direction of the belt, are disposed in a width direction of the belt, and are embedded in the body rubber; and
a reinforcement layer that extends in the longitudinal direction of the belt and is embedded in at least one of portions within the body rubber, which is located between the tension bodies and each of top surface and bottom surfaces of the body rubber,
wherein the belt is rounded in the width direction of the belt so that side end sections of the body rubber overlap on an upper side in a vertical direction to form a pipe-shaped section extending in the longitudinal direction of the belt, and an object to be carried is accommodated therein,
the reinforcement layer is formed in which a plurality of fabric members extending in the longitudinal direction of the belt are continuously provided in the width direction of the belt,
the side end sections of the fabric members among the fabric members, which are adjacent to each other in the width direction of the belt are connected to each other to form a fabric joint section, and
the fabric joint section is disposed on the inner side in the width direction of the belt rather than the both side end sections in the body rubber, and is disposed on an intermediate section that includes the center in the width direction of the belt.

2. A pipe conveyor comprising:
the conveyor belt according to claim 1; and
a belt support device that has a plurality of idlers disposed around a pipe axis on the outer side of the pipe-shaped section in the radial direction, and supports the pipe-shaped section by bring the idlers into contact with the pipe-shaped section from the outer side in the radial direction.

3. The pipe conveyor according to claim 2,
wherein the intermediate section of the body rubber is a section of the body rubber that is located between the intermediate section boundaries separated from the center in the width direction of the belt to both outer sides in the width direction of the belt, by the same distance as the size in the width direction of the belt of the side end section of the body rubber.

* * * * *